(12) United States Patent
Aki et al.

(10) Patent No.: US 10,373,093 B2
(45) Date of Patent: Aug. 6, 2019

(54) IDENTIFYING PATTERNS OF LEARNING CONTENT CONSUMPTION ACROSS MULTIPLE ENTITIES AND AUTOMATICALLY DETERMINING A CUSTOMIZED LEARNING PLAN BASED ON THE PATTERNS

(71) Applicants: International Business Machines Corporation, Armonk, NY (US); Skillsoft Ireland Limited, Dublin (IE)

(72) Inventors: Shota Aki, Weare, NH (US); John J. Ambrose, Nashua, NH (US); Yi-Min Chee, Yorktown Heights, NY (US); Wesley M. Gifford, Ridgefield, CT (US); Ashish Jagmohan, Irvington, NY (US); Suzanne M. Rodeman, Fairport, NY (US); Anshul Sheopuri, Teaneck, NJ (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 14/924,370

(22) Filed: Oct. 27, 2015

(65) Prior Publication Data
US 2017/0116554 A1     Apr. 27, 2017

(51) Int. Cl.
G06Q 10/06     (2012.01)
G06Q 50/20     (2012.01)

(52) U.S. Cl.
CPC ... *G06Q 10/06393* (2013.01); *G06Q 50/2057* (2013.01)

(58) Field of Classification Search
None
See application file for complete search history.

(56) References Cited

U.S. PATENT DOCUMENTS 6,601,034 B1 *  7/2003  Honarvar ............... G06Q 10/06
                                                            705/7.36
6,795,826 B2 *  9/2004  Flinn .................... G06F 21/6218
(Continued)

FOREIGN PATENT DOCUMENTS

WO     WO-0193112 A2 * 12/2001 ......... G06F 21/6218
WO     WO-0203354 A2 *  1/2002 ............... G09B 7/04
(Continued)

OTHER PUBLICATIONS

Seo, Young-Woo, and Byoung-Tak Zhang. "Learning user's preferences by analyzing Web-browsing behaviors." Proceedings of the fourth international conference on Autonomous agents. ACM, 2000. (Year: 2000).*
(Continued)

*Primary Examiner* — Thomas L Mansfield
*Assistant Examiner* — Derick J Holzmacher
(74) *Attorney, Agent, or Firm* — Scully, Scott, Murphy & Presser, P.C.; JoAnn Kealy Crockatt

(57) ABSTRACT

Identifying one or more patterns of content consumption across multiple entities and determining an engagement action for a user of an entity based on the patterns may include receiving information associated with content, cross-industry user data associated with consumption of the content, and a given organization user data associated with consumption of the content. A first set of consumption profile vectors associated with the given organization and one or more second set of consumption profile vectors associated respectively with one or more cross-industry organizations may be generated. Information associated with a target user in the given organization may be received. A customized learning plan for the target user in the given organization may be generated based on the first set of consumption profile vectors, the one or more second set of
(Continued)

consumption profile vectors, and the information associated with the target user.

20 Claims, 14 Drawing Sheets

(56) References Cited

U.S. PATENT DOCUMENTS

| | | | | |
|---|---|---|---|---|
| 6,892,193 | B2* | 5/2005 | Bolle | G06K 9/00711 |
| | | | | 706/20 |
| 7,467,947 | B2* | 12/2008 | Sperle | G09B 5/00 |
| | | | | 434/322 |
| 7,526,458 | B2* | 4/2009 | Flinn | G06N 5/048 |
| | | | | 706/12 |
| 7,848,941 | B2 | 12/2010 | Mann et al. | |
| 7,904,341 | B2* | 3/2011 | Flinn | G06Q 30/02 |
| | | | | 705/26.7 |
| 8,386,488 | B2* | 2/2013 | Jones | H04L 67/306 |
| | | | | 707/738 |
| 8,671,021 | B2 | 3/2014 | Maharajh et al. | |
| 2002/0156791 | A1 | 10/2002 | Nesamoney et al. | |
| 2002/0184043 | A1 | 12/2002 | Lavorgna, Jr. et al. | |
| 2003/0003433 | A1* | 1/2003 | Carpenter | G09B 7/04 |
| | | | | 434/323 |
| 2003/0004966 | A1* | 1/2003 | Bolle | G06F 16/58 |
| 2005/0278189 | A1* | 12/2005 | Mercadante | G06Q 10/06398 |
| | | | | 705/7.42 |
| 2006/0100987 | A1 | 5/2006 | Leurs | |
| 2007/0073553 | A1* | 3/2007 | Flinn | G06Q 30/02 |
| | | | | 705/1.1 |
| 2007/0055564 | A1* | 5/2007 | Sperle | G09B 5/06 |
| | | | | 434/350 |
| 2007/0111180 | A1* | 5/2007 | Sperle | G09B 5/06 |
| | | | | 434/350 |
| 2008/0195431 | A1 | 8/2008 | Abe et al. | |
| 2008/0270469 | A1 | 10/2008 | Myerson et al. | |
| 2009/0035733 | A1* | 2/2009 | Meitar | G09B 7/00 |
| | | | | 434/118 |
| 2011/0159472 | A1* | 6/2011 | Eck | G09B 5/06 |
| | | | | 434/322 |
| 2012/0254074 | A1* | 10/2012 | Flinn | G06N 7/02 |
| | | | | 706/4 |
| 2012/0290518 | A1* | 11/2012 | Flinn | G06N 5/048 |
| | | | | 706/12 |
| 2013/0290110 | A1* | 10/2013 | Luvogt | G06F 16/9535 |
| | | | | 705/14.66 |
| 2013/0290131 | A1 | 10/2013 | Bjork et al. | |
| 2013/0290306 | A1 | 10/2013 | Kast | |
| 2013/0290339 | A1* | 10/2013 | Luvogt | G06Q 10/10 |
| | | | | 707/740 |
| 2013/0311409 | A1* | 11/2013 | Ye | G09B 7/00 |
| | | | | 706/12 |
| 2013/0325948 | A1 | 12/2013 | Chen et al. | |
| 2014/0074558 | A1 | 3/2014 | Jain et al. | |
| 2015/0179078 | A1* | 6/2015 | Spagnola | G09B 5/00 |
| | | | | 434/362 |
| 2015/0206441 | A1* | 7/2015 | Brown | G09B 5/00 |
| | | | | 434/308 |
| 2015/0243179 | A1* | 8/2015 | Zaslavsky | G06Q 50/20 |
| | | | | 434/327 |
| 2016/0180248 | A1* | 6/2016 | Regan | G09B 5/00 |
| | | | | 706/12 |

FOREIGN PATENT DOCUMENTS

| | | | | |
|---|---|---|---|---|
| WO | WO-2004114177 | A2 * | 12/2004 | G06Q 10/06393 |
| WO | WO-2005116852 | A2 * | 12/2005 | G06Q 30/02 |
| WO | 2007148172 | A2 | 12/2007 | |
| WO | WO-2007148172 | A2 * | 12/2007 | G06F 16/437 |
| WO | 2010148002 | A2 | 12/2010 | |
| WO | WO-2010148002 | A2 * | 12/2010 | G06Q 30/02 |

OTHER PUBLICATIONS

Castellano, Giovanna, et al. "Similarity-based fuzzy clustering for user profiling." 2007 IEEE/WIC/ACM International Conferences on Web Intelligence and Intelligent Agent Technology-Workshops. IEEE, 2007. (Year: 2007).*

Kasabov, Nikola K. "Evolving connectionist systems for adaptive learning and knowledge discovery: Trends and directions." Knowledge-Based Systems 80 (2015): 24-33. (Year: 2015).*

Pazzani, Michael, and Daniel Billsus. "Learning and revising user profiles: The identification of interesting web sites." Machine learning 27.3 (1997): 313-331. (Year: 1997).*

Liu, Jiming, Chi Kuen Wong, and Ka Keung Hui. "An adaptive user interface based on personalized learning." IEEE Intelligent Systems 18. 2 (2003): 52-57. (Year: 2003).*

Seridi, Hassina, et al. "Adaptive instructional planning in intelligent learning systenns." Sixth IEEE International Conference on Advanced Learning Technologies (ICALT'06). IEEE, 2006. (Year: 2006).*

Seridi-Bouchelaghem, Hassina, Toufik Sari, and Mokhtar Sellami. "A neural network for generating adaptive lessons." Journal of Computer Science 1.2 (2005): 232-243. (Year: 2005).*

Tzouveli, Paraskevi, Phivos Mylonas, and Stefanos Kollias. "An intelligent e-learning system based on learner profiling and learning resources adaptation." Computers & Education51.1 (2008): 224-238. (Year: 2008).*

Premlatha, K. R., and T. V. Geetha. "Learning content design and learner adaptation for adaptive e-learning environment: a survey." Artificial Intelligence Review 44.4 (2015): 443-465. (Year: 2015).*

Anonymous, "UI affordance to monitor business metrics on dart board indicator visualization", Jul. 24, 2012, 4 pages.

Blum, A. L., et al., "Selection of relevant features and examples in machine learning", Artificial Intelligence, Dec. 1997, 97, pp. 245-271.

* cited by examiner

IDENTIFYING PATTERNS OF LEARNING CONTENT CONSUMPTION ACROSS MULTIPLE ENTITIES AND AUTOMATICALLY DETERMINING A CUSTOMIZED LEARNING PLAN BASED ON THE PATTERNS

FIELD

The present application relates generally to computers and computer applications, and more particularly to educational or online learning and providing online learning or educational material and recommendations.

BACKGROUND

Individual firms or organizations may have learning goals for its users and provide learning material to those users. In one aspect, the present disclosure provides for deriving strategy-related insights, and consolidating such insights across multiple organizations in multiple sectors to develop strategy-enabling learning plans for an individual organization, e.g., for providing on-line learning plans.

BRIEF SUMMARY

A system and computer-implemented method of identifying one or more patterns of content consumption across multiple entities and determining an engagement action for a user of an entity based on the patterns may be provided. The system, in one aspect, may include one or more hardware processors. An engagement engine may be operable to execute on one or more of the hardware processors, the engagement engine further operable to receive information associated with content, cross-industry user data associated with consumption of the content, and a given organization user data associated with consumption of the content. The engagement engine may be further operable to generate a first set of consumption profile vectors associated with the given organization and one or more second set of consumption profile vectors associated respectively with one or more cross-industry organizations. The engagement engine may be further operable to receive information associated with a target user in the given organization. The engagement engine may be further operable to determine a customized learning plan for the target user in the given organization based on the first set of consumption profile vectors, the one or more second set of consumption profile vectors, and the information associated with the target user, the customized learning plan specifying the target user, one or more courses for learning, estimated time for consuming the one or more courses, and modality of consuming the one or more courses.

A computer-implemented method of identifying one or more patterns of content consumption across multiple entities and determining an engagement action for a user of an entity based on the patterns, in one aspect, may include receiving information associated with content, cross-industry user data associated with consumption of the content, and a given organization user data associated with consumption of the content. The method may also include generating a first set of consumption profile vectors associated with the given organization and one or more second set of consumption profile vectors associated respectively with one or more cross-industry organizations. The method may also include receiving information associated with a target user in the given organization. The method may also include determining a customized learning plan for the target user in the given organization based on the first set of consumption profile vectors, the one or more second set of consumption profile vectors, and the information associated with the target user, the customized learning plan specifying the target user, one or more courses for learning, estimated time for consuming the one or more courses, and modality of consuming the one or more courses.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Machine analytics such as machine learning techniques and other data mining techniques may be provided that evaluate content consumption data across a variety of firms and derive strategy-related insights, and consolidate such insights across multiple organizations in multiple sectors to develop strategy-enabling learning plans for each individual organization. A method and/or system in the present disclosure in one embodiment may identify correlation in behaviors across firms or organizations, identify customized learning plans for adaptive, targeted resource and content development, identify complementary metrics (e.g., key performance indicators (KPIs)) to assess value of service, and leverage variety of content residing in highly-connected content forests (organization structures or hierarchies of content).

A method and/or system in one embodiment of the present disclosure identify intrinsic strategic patterns of content consumption across diverse entities (e.g., firms, business units (BUs), industries, sectors, geographies, and/or others), and leverage the identified patterns to drive engagement, for example, for improved entity strategic alignment. Examples of content may include, but are not limited to, web pages, technical documents, and online learning material. Features determining who, what, when and how to engage a user, may include: inferring strategic shifts from consumption patterns across entities, for example, over time, for (a) guidance on recommended strategic directions and/or (b) targeted proactive existing learning need identification; inferring user goals from virtual folders of consumption patterns to create new customized learning plans; identifying and leveraging complementary metrics to drive engagement actions and assess value; and leveraging content-forests for learning plan design. Content-forest refers to organization or hierarchy of content.

Figure 1:
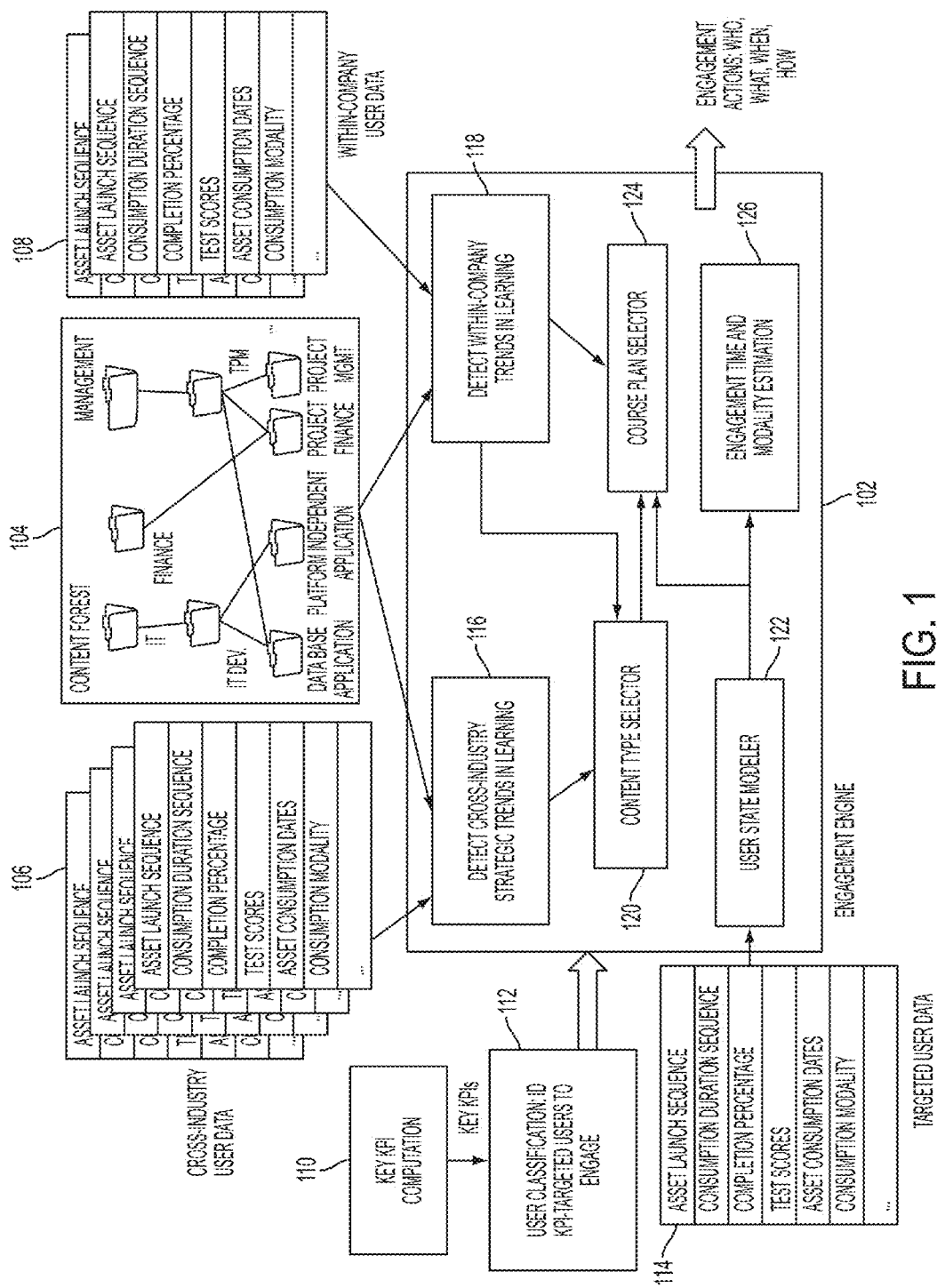
FIG. 1 is a diagram illustrating an engagement engine in one embodiment of the present disclosure.

FIG. 1 is a diagram illustrating an engagement engine in one embodiment of the present disclosure. The engagement engine in one embodiment determines engagement actions, for example, who, what, when and how to identify and leverage strategic patterns of content consumption. The engagement engine 102 may run on one or more hardware processors such as a central processing unit (CPU) or another processor type, e.g., coupled with one or more memory devices. In one embodiment, input to an engagement engine 102 may include content, for example, hierarchies of content 104, also referred to as content forest 104, which comprises content such as learning material or course material, e.g., including but not limited to audio and/or video material, web pages, technical documents, and the like, for example, organized in hierarchical structure. For instance, as shown at 104, content associated with learning material for JAVA™ may be organized under Information Technology (IT) Development folder, which in turn may be organized under IT folder. As another example, content associated with project management may be organized under Technology Project Management (TPM) folder, which in turn may be organized under Management folder.

Additionally, user data associated with the content may be input. For example, user data may be within-company user data 106 and cross-industry user data 108. User data (106, 108) include information about a user's consumption of content, for a plurality of users. Such information as shown at 106 and 108 may include, but are not limited to, asset launch sequence that specifies a sequence of consumption of different content which a user consumed, consumption duration sequence that specifies how long a user spent consuming content, completion percentage that indicates what percent or amount of particular content a user consumed, test score(s) that indicates one or more scores on a test that a user took related to the content, asset consumption dates that specifies the date and time a user consumed particular content and consumption modality that indicates how a user consumed content, e.g., via a platform, web browser, video, and/or audio, and/or others. Other information related to content and user may be provided.

Key KPI computation component 110 (also referred to as a KPI generator) may determine a set of KPIs, for example, users who consumed at least 50 minutes of content, users who consumed at least 5 pieces of content, and others. Based on these KPIs the system and method of the present disclosure in one embodiment can appropriately target actions. User classification component 112 identifies users who fail to satisfy the KPIs computed at 110. Those users are KPI-targeted users for engagement, for whom for example, the engagement engine determines a course plan for learning. For one or more of the KPI-targeted users, the engagement engine 102 may determine engagement actions.

Based on the content forest 104 and the cross-industry user data 108, a cross-industry trends detector 116 detects trends in learning by users of organizations across industry (e.g., different firms, organizations). Similarly, based on the content forest 104 and the within-company user data 106, a within-company trends detector 118 detects trends in learning by users of a particular organization.

Based on the trends detected by the cross-industry trends detector 116 and the within-company trends detector 118, a content type selector 120 identifies content that the organization should focus on in learning. Examples of content type may include, but are not limited to, software development, big data and IT management.

Data 114 associated with the targeted user identified at 112 may also be input to the engagement engine 102. A user state modeler 122 models or determines the state of targeted user based on the targeted user data 114. A user state model that is generated by the user state modeler 122 includes information such as how much of content a targeted user consumed, when the content was consumed, and other information. The user state modeler in one embodiment takes the targeted user data 114 as input and produces an output which indicates the user state: for example, state may relate to the user's level of engagement: e.g., "actively engaged" or "user with many incomplete goals". State may relate to user's work situation: e.g., "just entered new role", "senior manager", "new hire". Generally, state captures information more complex than the input 114.

A course plan selector 124 selects and/or plans learning material for the targeted user based on the content type selected by the content type selector 120, user state model generated by the user state modeler 122 and the within-company trends in learning detected by the within-company trends detector 118.

An engagement time and modality estimation component 126 determines the time and modality for the targeted user to consume the learning material, for example, the courses planned by the course plan selector 124. The time specifies when the user is best inclined to consume the learning material. The modality specifies how the user should consume the learning material, for example, by video, audio, web browser, and/or others.

Thus, in one aspect, the engagement engine 102 determines engagement actions, for example, what course material to consume, by whom (e.g., targeted user), when and how. This information determined by the engagement engine 102 may be used to drive an automated learning system, for example, that may automatically execute or run the selected courses according to the determined modality at the selected time for the targeted user. A graphical user interface, for example, may automatically open on the target user's device to begin the selected class or course at the selected time.

In one embodiment, the cross-industry trends detector 116 and the within-company trends detector 118 may run or execute a strategic shift detection technique or algorithm to detect trends in learning. Shifts in content consumption in the content catalog (e.g., individual content item, catalog level, and/or others) that occur across time and across multiple organizations can be indicative of a shift in the strategic direction of entities such as firms, business units, and/or others. Profile vectors can be captured by measuring the fraction of content interactions in the content catalog folders:

$$m_j^{(i)}(t) = \frac{\Sigma_{k,l} I\{a_{k,l}^{(i)}(t) \in C_j\}}{N^{(i)}(t)}$$

$$m^{(i)}(t) = [m_1^{(i)}(t), m_2^{(i)}(t), \ldots, m_M^{(i)}(t)]$$

In the above equations, $m_j^{(i)}(t)$ is the fraction of content consumed by firm (i) in category j at time period t. $a_{k,l}^{(i)}(t)$ is the lth asset consumed by the kth user of the ith firm at time period t, $C_j$ is the jth content category. I{ } is the indicator function, where I{x} is 1 if x is true, and 0 otherwise. $N^{(i)}(t)$ is the total number of assets consumed in period t by firm i. $m^{(i)}(t)$ represents a vector for consumption fractions across the different categories—yielding a consumption profile for firm (i) during period t.

In one aspect, similarity between profile vectors can be computed with cosine similarity:

$$\cos(\theta^{(i,j)}) = \frac{m^{(i)} \cdot m^{(j)}}{\|m^{(i)}\| \, \|m^{(j)}\|}$$

In the above equation, the (t) has been dropped from each term for clarity. $m^{(i)}$ and $m^{(j)}$ represent the consumption profiles for firms i and j. $theta^{(i,j)}$ represents the angle between these two consumption profiles. The smaller the angle, the more similar are the profile vectors.

This similarity measure, captured over time, can be used to:

Identify strategically related pairs/groups of entities: Angle between firms over time is consistently less than $\theta_{max}$);

Within-firm strategy change: If the angle between profile vectors from the same firm for two consecutive time periods is large, it indicates that a shift has occurred;

Between-firm strategy change: If the angle between two profile vectors from different firms for the same time period is large, then these firms exhibit different strategies.

Knowledge of related entities can be used to recommend appropriate content to drive engagement.

Figure 2:
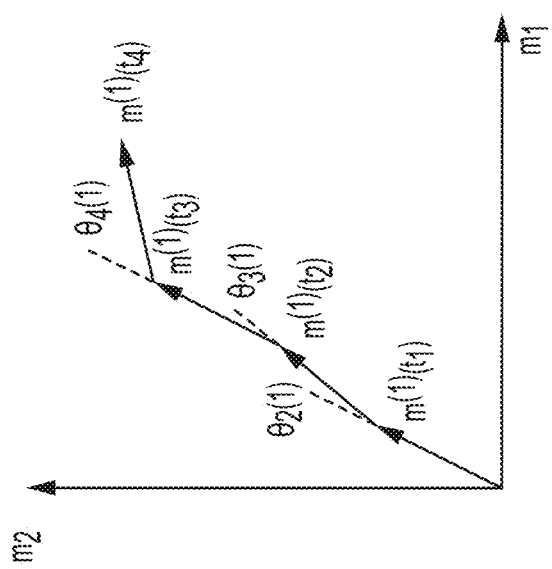
FIG. 2 illustrates example profile vectors for one firm in one embodiment of the present disclosure.

FIG. 2 illustrates example profile vectors for one firm in one embodiment of the present disclosure. Profile vectors for one firm is referred to as a first set of profile vectors. In this example, the firm displays similar behaviors over the first three time periods (angles between vectors are small). In the fourth period, the angle is large indicating a potential shift in strategy.

Figure 3:
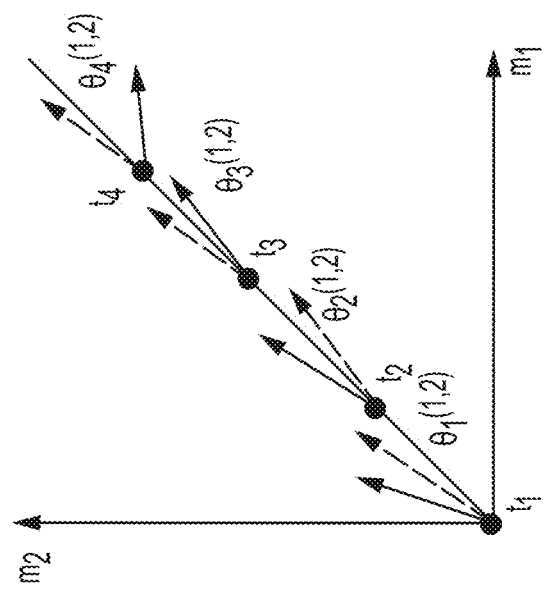
FIG. 3 illustrates example profile vectors for two firms in one embodiment of the present disclosure.

FIG. 3 illustrates example profile vectors for two firms in one embodiment of the present disclosure. Profile vectors of one firm (referred to as a first set of profile vectors) are shown with solid arrow lines; profile vectors of another firm (referred to as a second set of profile vectors) are shown with dashed arrow lines. In this example, the firms are similar for the first three time periods, but in the third time period one firm (solid arrow) diverges from the trend. Since these firms were similar, content used by the firm represented with solid arrow should be recommended for the firm represented with dashed arrow. The above equations in one embodiment indicate how to formulate the profile for each firm and how to measure difference between two firms at one period and between different periods for one firm. Trends of the angles (theta) are observed over time and incorporated by the content type selector and/or course plan selector.

The course plan selector (e.g., FIG. 1, 124) may generate customized learning plans. For example, the course plan selector may determine which courses or learning material associated with the content type selector determined content, a targeted user should consume. In one embodiment of the present disclosure, an algorithm that determines a customized course plan forms or generates a matrix that links users to assets (e.g., courses, learning material). The algorithm in one embodiment determines virtual combinations of assets which constitute effective learning plans for specific types of expertise. "Virtual" folders comprise soft-clusters of assets which are related to each other through common usage for users seeking expertise in specific skills.

Figure 4:
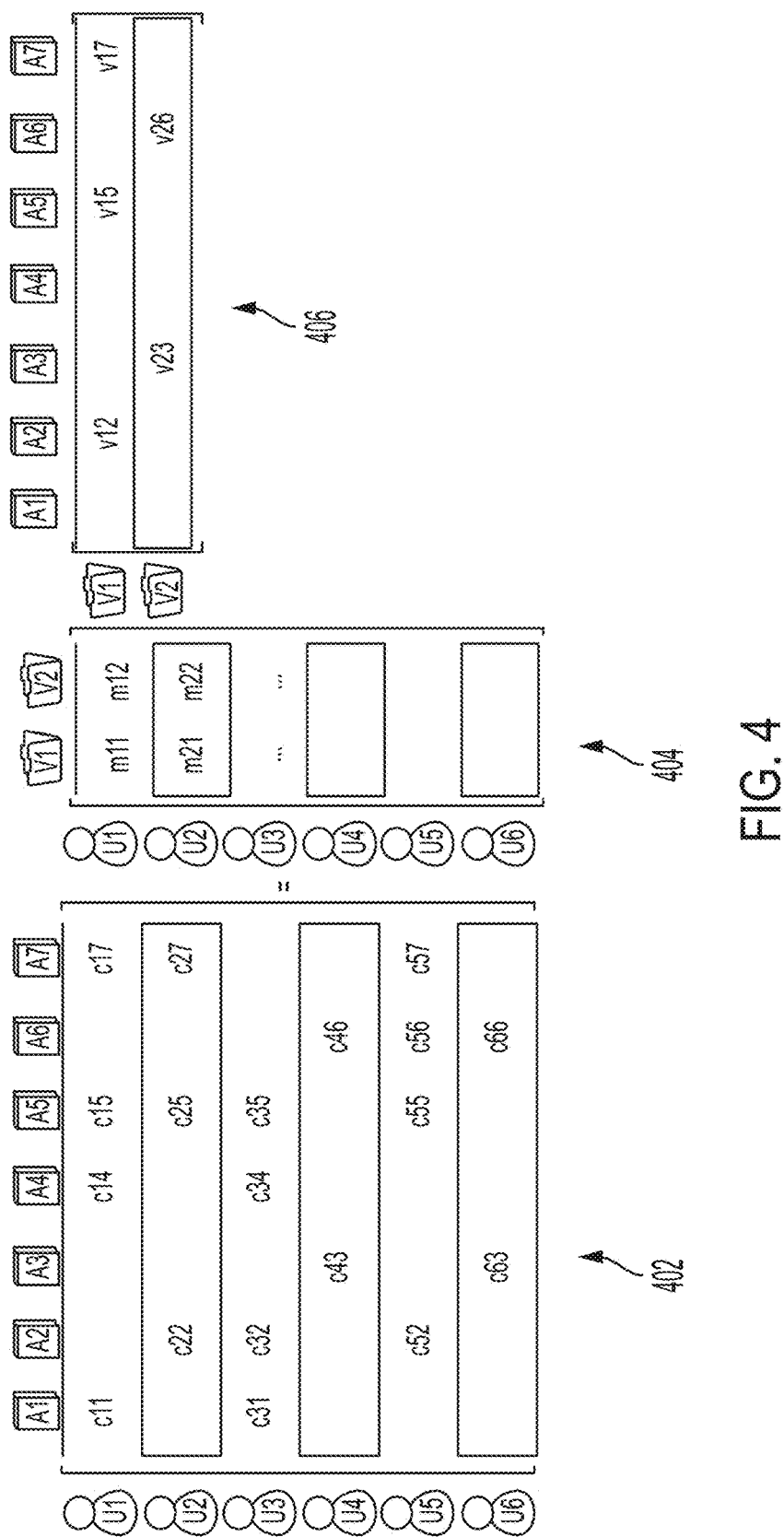
FIG. 4 illustrates matrices generated in one embodiment of the present disclosure for course plan selection.

FIG. 4 illustrates matrices generated in one embodiment of the present disclosure for course plan selection. In the matrix shown at 402, the rows represent users and the columns represent assets (e.g., course, learning material). The values inside the matrix represent a confidence score that indicates how likely a given user is interested in taking or consuming a given asset (e.g., course, learning material). The matrix 402 with confidence scores may be generated based on historical data associated with characteristics of users who have taken the courses.

The algorithm in one embodiment factorizes the matrix 402 into two matrices 404, 406, for example, using a matrix factorization technique. In the matrix shown at 404, virtual folder is represented in the columns. In the matrix shown at 406, virtual folders are represented in the rows. Virtual folders comprise assets in terms of probability, probabilistic assets. Assets used by the same sets of users are contained in the same virtual folder. The matrix at 404 provides compositions of virtual folders in terms of virtual assets, e.g., interest profiles of users. For instance, the probability that user U1 is interested in virtual folder V1 is m11, the probability that user U1 is interested in virtual folder V2 is m12, the probability that user U2 is interested in virtual folder V1 is m21, the probability that user U2 is interested in virtual folder V2 is m22, and so forth. The matrix at 406 provides a composition of assets in virtual folders. For instance, virtual folder V1 contains assets A2, A5, and A7, in terms of probability v12, v15 and v17, respectively; virtual folder V2 contains assets A3 and A6, in terms of probability v23 and v26, respectively. The v numbers here represent the probabilities that a certain asset is a member of a virtual folder. Shown at 406, Assets 2, 5 and 7 have high membership scores for virtual folder 1. Assets 3 and 6 have high scores for virtual folder 2. In this example, entries indicated as significant are labeled. For instance, constraints imposed on matrix factorization lead to sparseness (few non-zero entries) in the matrix 406.

Consider that the content type selector (e.g., FIG. 1, 120) identified content types, e.g., software development, big data and IT management for an organization to have its users for learning areas or topics. Among those content types, the course plan selector (e.g., FIG. 1, 124) may determine assets (e.g., courses or learning material) for a targeted user. For example, based on the matrix factorization described above, the course plan selector may present a virtual folder (with its assets) that has the highest affinity to the targeted user. For example, a virtual folder with highest probability value (e.g., m11 or m12 for U1) in matrix at 404 may be recommended to U1. Based on a user's consumption and, for example, through matrix factorization, that consumption may be represented in terms of virtual folders. These virtual folders take into account the behavior of other users. By examining at what the user has consumed and the assets in the virtual folders, the methodology in one embodiment of the present disclosure can identify a set of assets not yet consumed by the user. Those identified set of assets may be recommended.

In another embodiment, a weighted combination of folder affinity and "surprise" factor may be identified. The "surprise" factor may be a measure or degree of newness, for example, a how new the content is to the user.

In one embodiment, an optimal matrix factorization problem, for which efficient solvers exist (Alternating Least Squares (ALS), non-negative matrix factorization (NMF), stochastic gradient descent (SGD)), may be utilized in the above described algorithm.

The following expression in one embodiment determines virtual combinations or virtual folders:

$$\arg\min_{\{m_{i,j}\},\{v_{i,j}\}} \sum_i \sum_j f(c_{i,j})(b_{i,j} - m_i^T \cdot v_j)^2 + \gamma \sum_i \|m_i\|^2 + \nu \sum_j \|v_j\|^2 \text{ where } b_{i,j} = I(c_{i,j} > 0)$$

In the above equation, $c_{i,j}$ represents a confidence value; represents a binary variable, e.g., 1 if a corresponding confidence exists, and 0 if the corresponding confidence does not exist, which are given values. For instance, the confidences values ($c_{i,j}$) are computed based on historical data. For example, based on data such as how long and how recently a user spent on a particular asset (e.g., course or learning material), confidence score that the user is interested in that asset may be computed. For instance, a user who spends 1 hour on a particular asset may have higher confidence score than a user who spends 10 minutes on that asset. $b_{i,j}$ values are a function of respective $c_{i,j}$ values. The terms i and j represent indices. The m's and v's in the equation represent factorized matrices (examples of which are shown at 404 and 406). Solving the equation determines the m and v values, $\gamma$ and $\nu$ represent regularization parameters. The algorithm finds clusters and user-cluster affinity so as to match historical expertise data.

Figure 5:
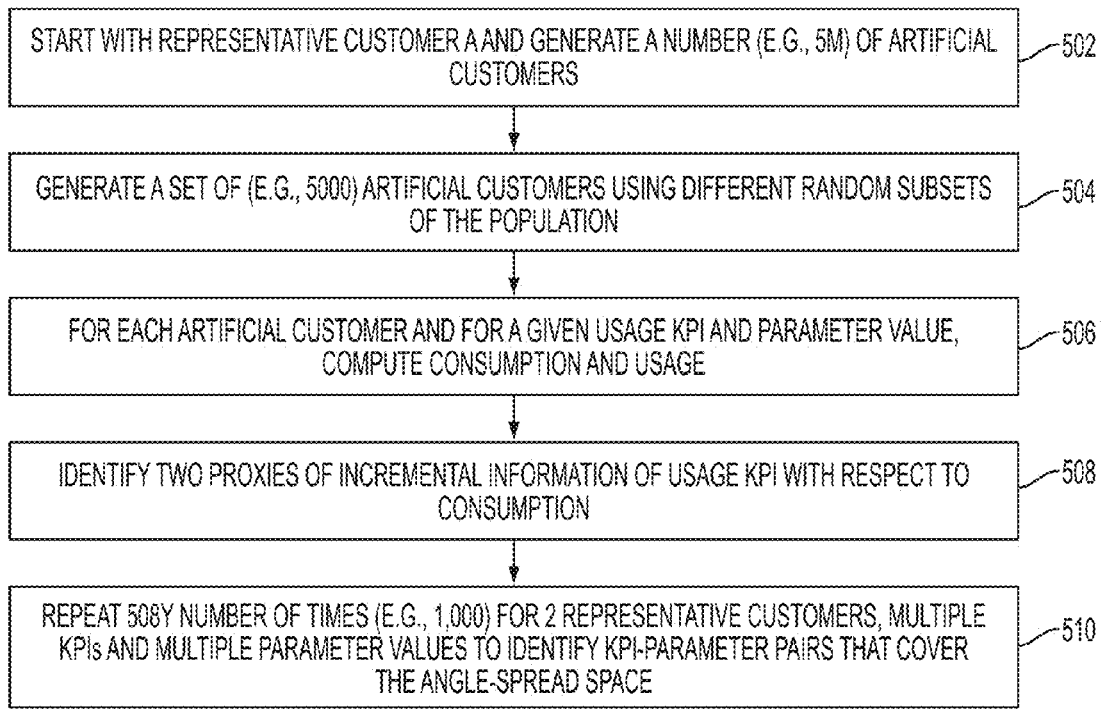
FIG. 5 is a flow diagram showing an algorithm that identifies metrics in one embodiment of the present disclosure.

FIG. 5 is a flow diagram showing an algorithm that identifies metrics in one embodiment of the present disclosure. The algorithm identifies a set of complementary metrics (which have not previously been captured) that help in assessing the value of provided course plans and strategy in learning. The algorithm may be used in computing key KPI(s), e.g., shown in FIG. 1 at 110. The computed key KPIs may be used to select targeted users to engage in learning. The algorithm in one embodiment generates artificial data that would exhibit relationships between KPIs that help in identifying or selecting a set of KPIs that help in assessing the value of or capturing the performance of the provided course plans.

At 502, the algorithm may start with representative customer A (or organization A) data and may generate an X number of (e.g., 5 million (M)) artificial customer data.

At 504, an X/Y number of artificial customers (e.g., 5,000) may be generated using different random subsets of the population.

Figure 6B:
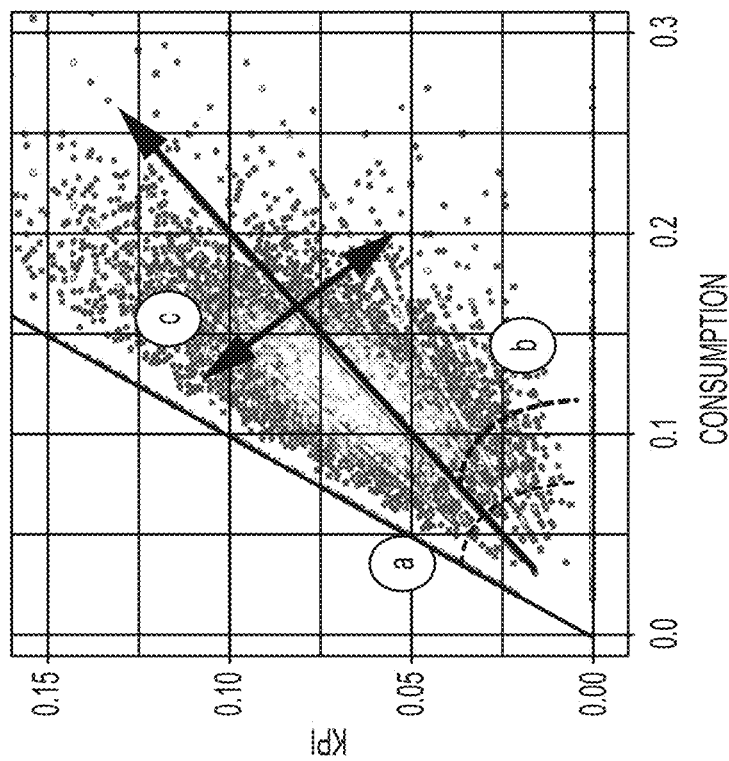
FIG. 6B shows a graphical representation of the two proxies in one embodiment of the present disclosure.
Figure 6A:
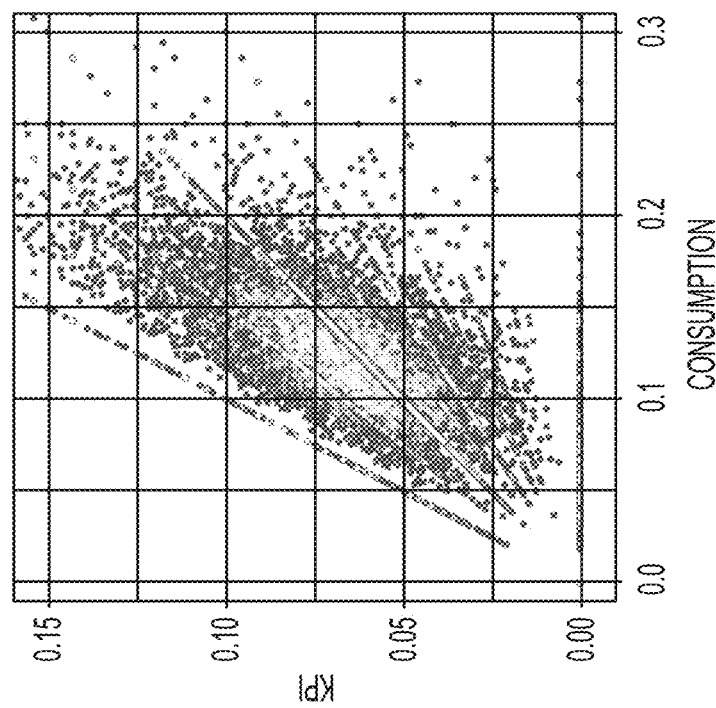
FIG. 6A shows an example consumption usage graph shown as scatter plot.

At 506, consumption and usage may be computed for each artificial customer and for a given usage KPI and parameter value. In one aspect, KPIs may be annualized to account for variations between customers. FIG. 6A shows an example consumption usage graph. The x-axis represents the consumption amount and the y-axis represents a KPI. Sample KPIs may include: Fraction of users who accessed 5 or more distinct pieces of content; Fraction of users who spent 60 or more minutes on content items prescribed in a learning plan.

At 508, two proxies of incremental information of usage KPI with respect to consumption are identified. FIG. 6B shows a graphical representation of the two proxies in one embodiment. The x-axis represents the consumption KPI and the y-axis represents a new KPI. The area under the line labeled (a) is Consumption; Angle shown as (b) represent the slope of the ordinary least squares regression fit line: If the slope is close to consumption line, it adds little incremental information. The area shown at (c) represents the spread: Residual (error) of the ordinary least square regression fit line: If the spread of the fit is too small, it does not contain discrimination in usage for same level of consumption.

Figure 6C:
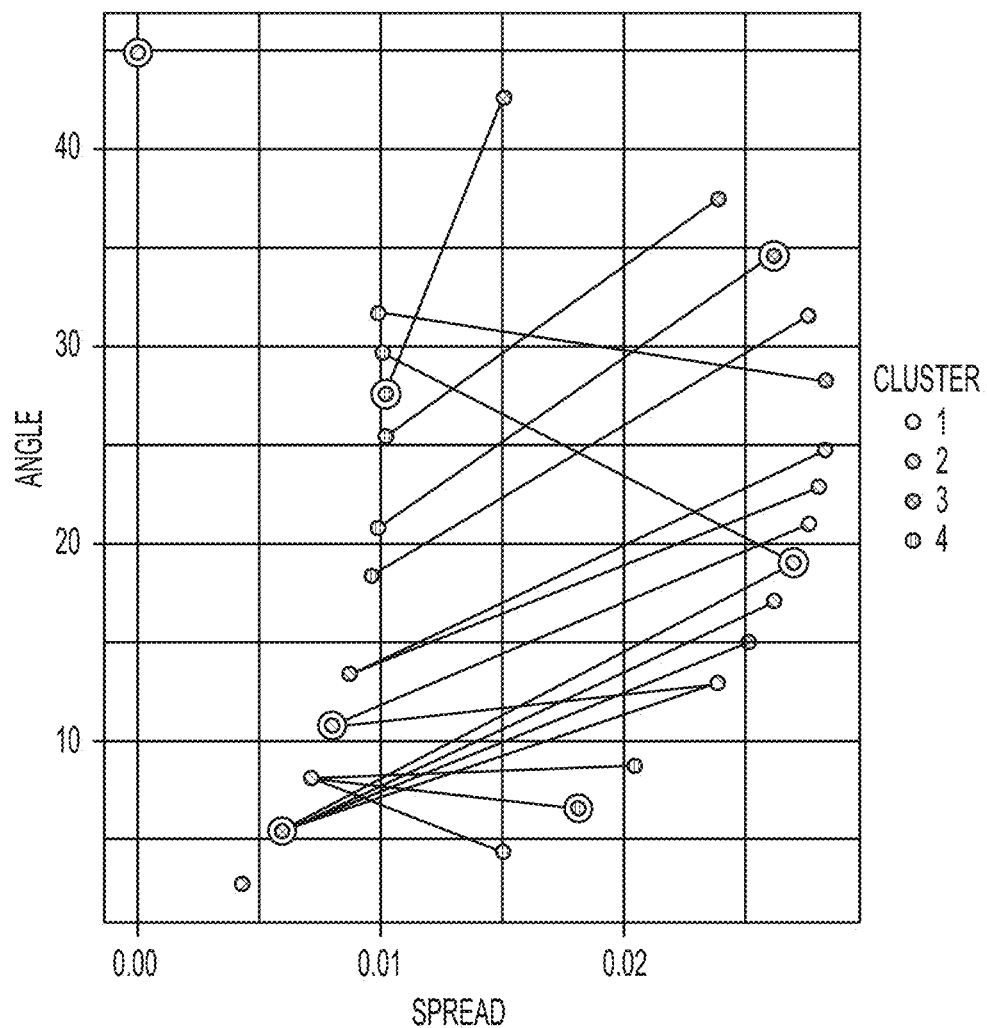
FIG. 6C shows angle-spread space in one embodiment of the present disclosure.

At 510, the processing of 508 may be repeated for Y number of times (e.g., 1,000) for 2 representative customers as well as multiple KPIs and multiple parameter values to identify KPI-parameter pairs that cover the Angle-Spread space. FIG. 6C shows angle-spread space in one embodiment of the present disclosure. An entropy approach may be utilized to validate the finding independently. For example, apart from consumption, a new set of KPIs, e.g., the fraction of users that consume 5 or more unique pieces of content, 160 minutes or more of content, 40 minutes or more of content are identified by the method shown in FIG. 5.

Figure 7:
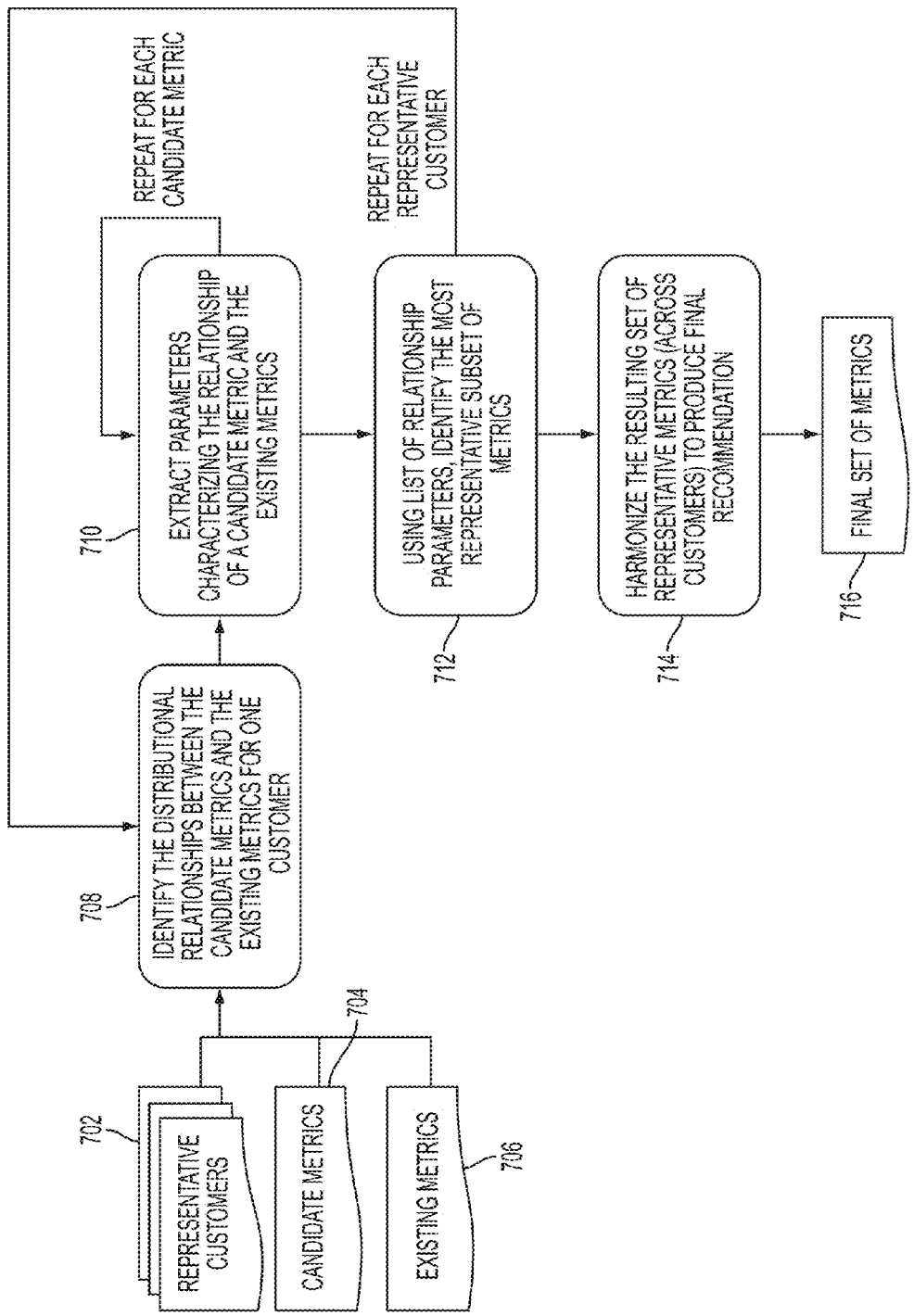
FIG. 7 illustrates a metric identification process in detail in one embodiment of the present disclosure.

FIG. 7 illustrates a metric identification process in detail in one embodiment of the present disclosure. Inputs to the method a metric identification process may include representative customers 702, candidate metrics 704 and existing metrics 706. At 708, distributional relationships may be identified between the candidate metrics 704 and the existing metrics 706 for one customer 702. For example, random sampling techniques may be used to generate many random customers from one set of customer data. The relationship of a candidate metric versus a metric that is currently tracked may be evaluated.

At 710, parameters characterizing the relationship of a candidate metric and the existing metrics may be extracted. For example, for each new metric calculated, consider how it compares to the existing metric along one or more dimensions. For instance, a comparison may be performed by computing a regression line that relates the new metric to the existing one. An example regression may be: $x_{new} = \beta_1 x_{existing} + n$. The processing at 710 may be repeated for each candidate metric.

The following parameters may be considered:

The slope of this line ($\beta_1$): This characterizes the difference in the new metric from the existing metric.

The standard deviation of the residual errors ($\beta_1 x_{existing} - x_{new}$): This characterizes the variation in the new metric for a single value of the existing metric. Greater variation allows for increased ability to differentiate the entities when making inferences.

At 712, using list of relationship parameters, the most representative subset of metrics may be identified. For example, the parameters extracted from the metric relationships may be divided into clusters using one or more clustering techniques. To ensure that cluster centers are represented by one of the metrics, a medoid-based clustering technique may be used. The processing at 712 may be repeated for each representative customer (e.g., received at 702).

At 714, the resulting set of representative metrics (across customers) may be harmonized to produce final recommendation. When considering multiple customers there may be a variation in the metrics that are recommended for capture. In this case, the metrics are harmonized. For example, a nearest-neighbor search algorithm may be used, which evaluates the overlap in metrics between customers considering up to the n nearest neighbors of the cluster centers.

The final set of metrics 716 may be presented.

The metric identification process is useful, for example, for learning and knowledge companies that would like to understand which metrics to capture beyond consumption. Consumption shows that a user consumes an available license if the user accesses one or more pieces of content. Fraction of licenses consumed is the number of users who consumed one or more pieces of content divided by the total available licenses. Additional metrics such as a fraction of users who consumed k or more unique pieces of content, and a fraction of users who spent t or more minutes with content may be considered.

Figure 8A:
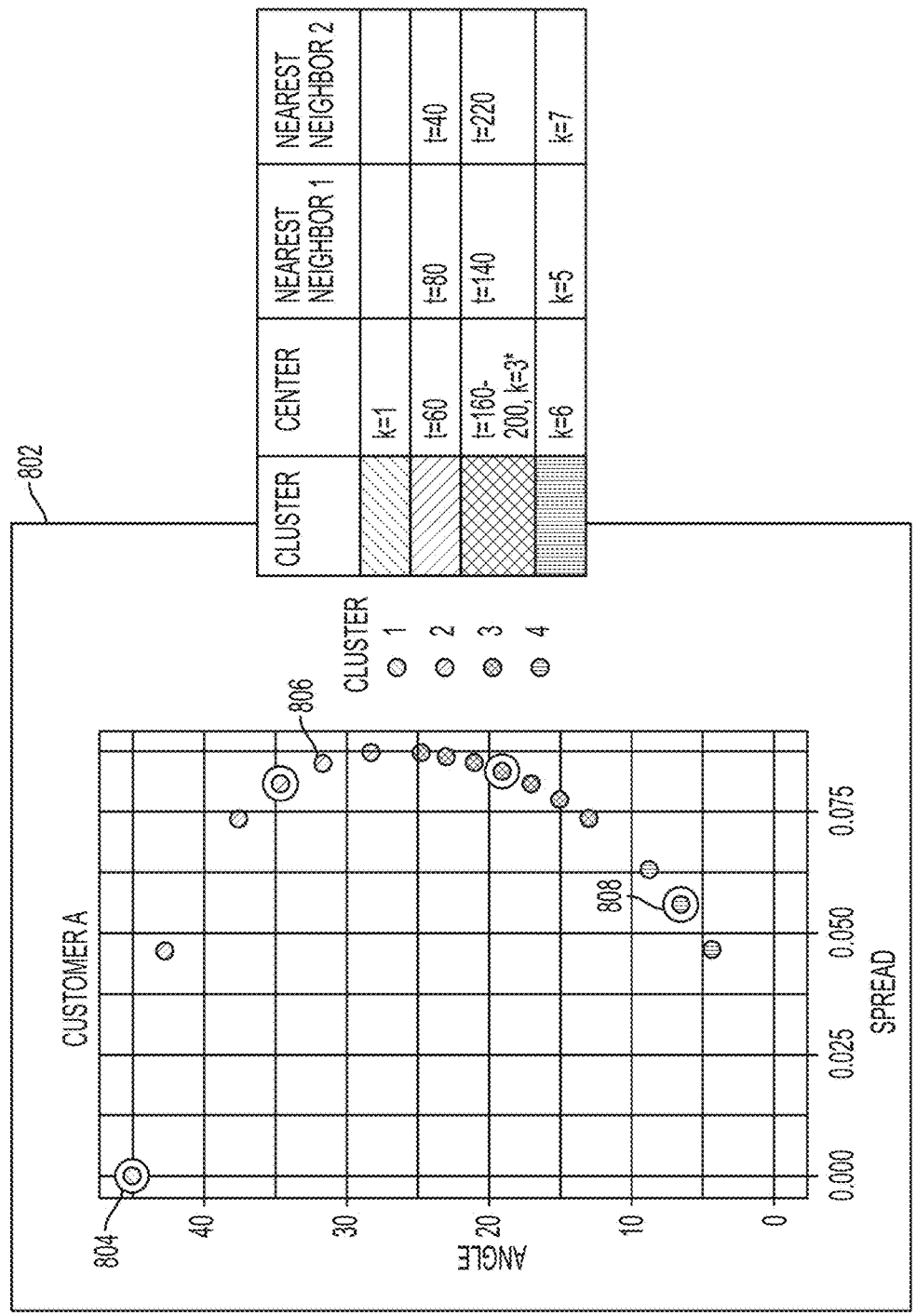
FIG. 8A shows example KPI clusters for an example customer, in one embodiment of the present disclosure.

FIG. 8A shows example KPI clusters for an example customer, in one embodiment of the present disclosure, for example, identified according to a method in one embodiment of the present disclosure. The figure shows selecting additional KPIs, if for example, KPIs other than consumption are permitted. In the example, Angle-Spread space shown at 802, four clusters are identified in an Angle-Spread space of the centroids of 5 M customer simulations, referred to as first, second, third and fourth clusters. KPI and parameter pairs in the same cluster contain similar information. Thus, the results indicate that value lies in three new KPIs: t=60, t=160-180/k=3 and k=6. For example, each time an experiment outlined in the above paragraphs are conducted, new points on graph shown in FIG. 8A may be generated. The points encircled are the medoids of the determined clusters. Based on which experiment generated the encircled points, KPIs/parameters that generated those points are identified. The first cluster at 804 contains the KPI k=1, which is equivalent to consumption. Each point, e.g., at 806, represents the centroid of the simulation results for 5 M customers for a particular KPI and parameter choice. Centroid of the fourth cluster is shown at 808, e.g., a representative KPI parameters pair that best represents the value of information from that cluster.

Figure 8B:
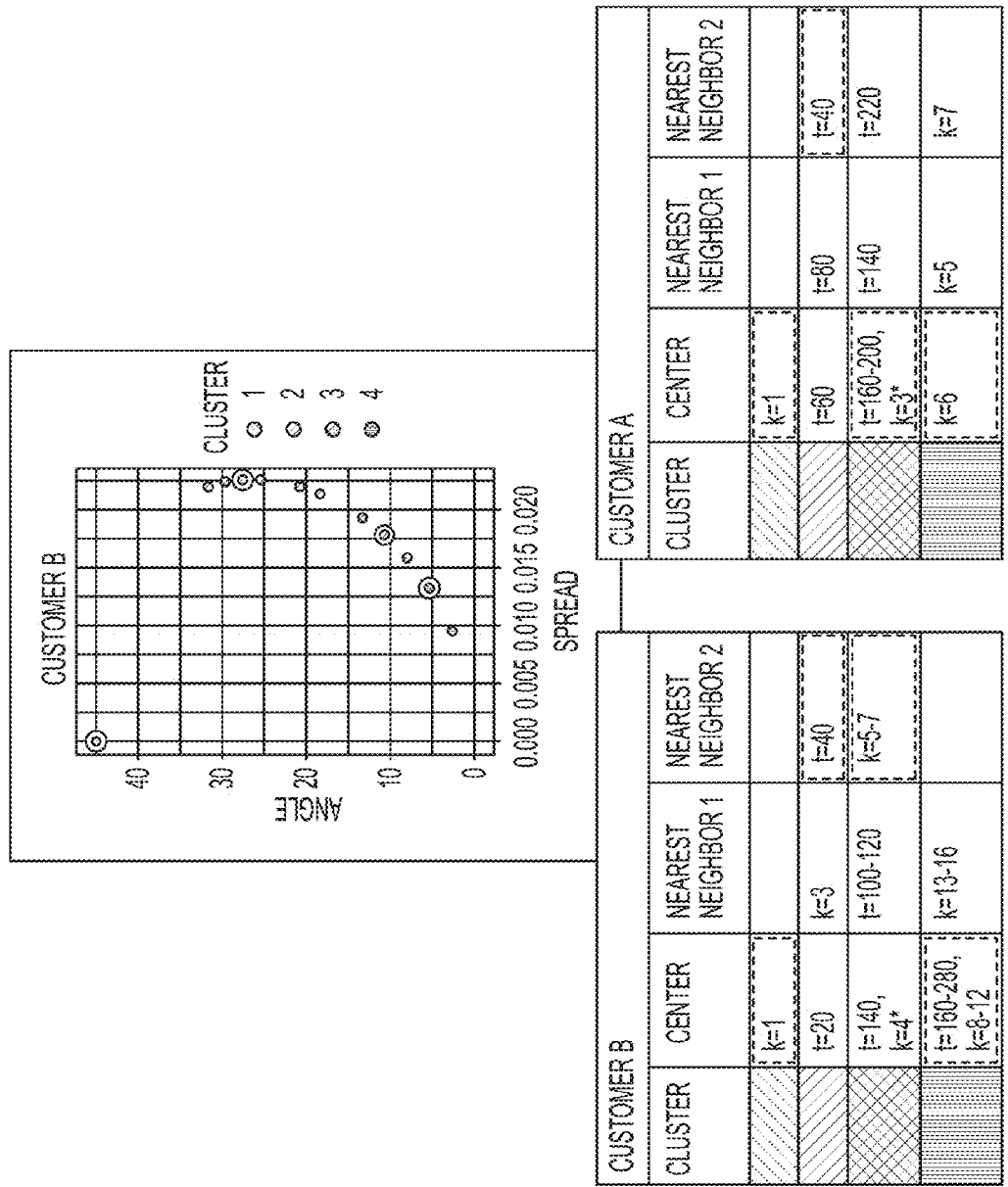
FIG. 8B shows a comparison of two representative customers in one embodiment of the present disclosure.

FIG. 8B shows a comparison of two representative customers in one embodiment of the present disclosure. Customer B vs. customer A shows similar but not identical results. For example, similar analysis is conducted for Customer B to identify clusters, e.g., shown at 810. Results of customer B and customer A are compared to identify the set of KPI-parameter pairs that are either the centroid or n-Nearest Neighbor of the centroid in each of the four clusters for both the customers. Recommendation based on Customer A and B analysis: The following 4 KPI-parameter pairs contain maximum value: k=1 (consumption), k=6, t=40, t=160.

Figure 9A:
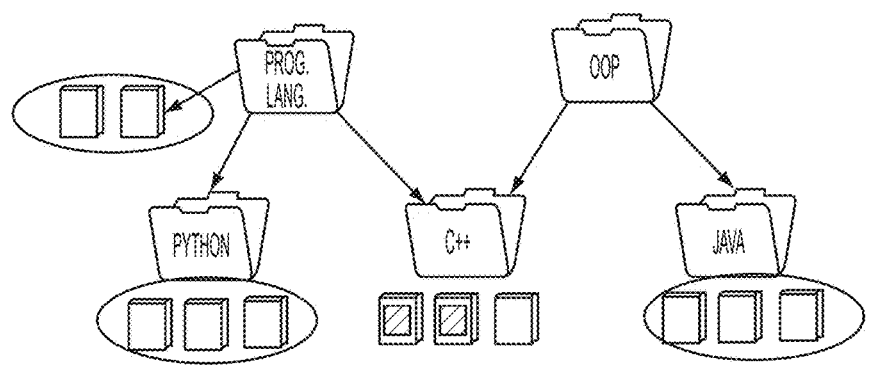
FIG. 9A shows an example hierarchical model of content, e.g., content forest.
Figure 9B:
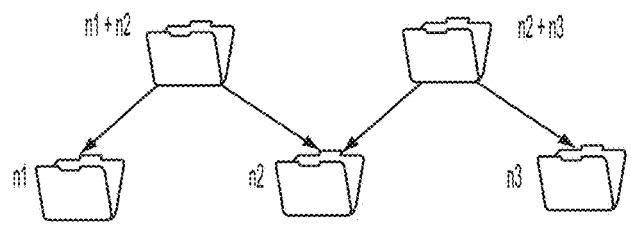
FIG. 9B shows an example user signature represented by an aggregate asset-folder along a hierarchy of folders.

The content forest may be leveraged as follows. Content hierarchy may be leveraged for fine-grained taste estimation. FIG. 9A shows a hierarchical model of content, e.g., content forest. If user has shown interest in an asset-folder, user is likely interested in "neighboring" asset-folders in hierarchy also. FIG. 9B shows an example user signature represented by an aggregate asset-folder up the hierarchy. Correlating user-signature with asset hierarchy membership can yield more accurate correlation between user taste and asset type, providing for more fine-grained estimate of user's tastes.

Folders represented as root nodes may be the most "popular", but least informative. Informativeness is inversely related to the number of users who have touched a folder. Information-theoretic measure which quantifies and weighs asset-folders by informativeness may be used. For folder-hierarchy $\{f_1, f_2, \ldots f_F\}$ corresponding to a given asset, let user's historical folder consumption be $$\{n^u_{f_j}\}_1^{|F|}$$

where $n_{f_j}^u$ is the number of assets consumed by user u in folder fj.

Let number of unique users per asset folder be:

$$\{U_{f_j}\}_1^{|F|}$$

where $U_{f_j}^u$ is the number of unique users having consumed assets in folder fj.

Then in one embodiment, type-interest score is computed as:

$$\sum_{f_1}^{f_F} g(n^u_f) \log \frac{1}{h(U_f)}$$

In one embodiment, final asset score is function of type-interest score and asset popularity. g( ) and h( ) are appropriate functions.

Figure 10:
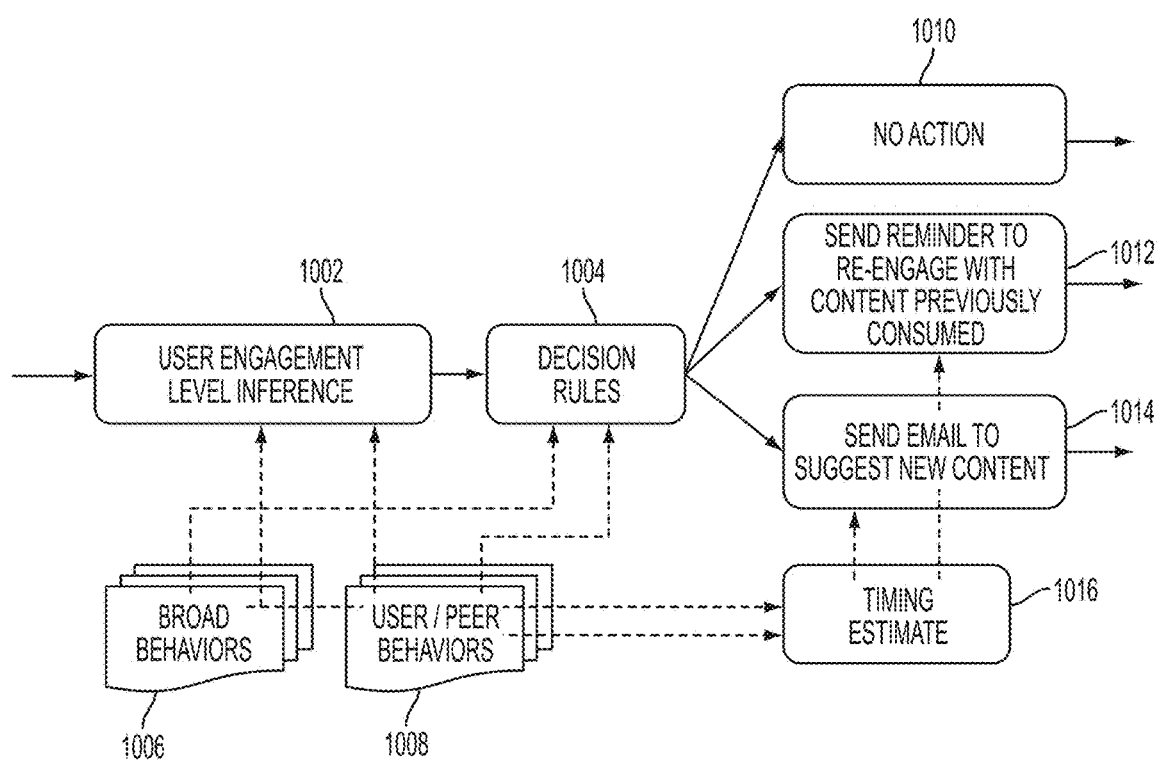
FIG. 10 is a flow diagram illustrating a method of determining engagement preference in one embodiment of the present disclosure.

FIG. 10 is a flow diagram illustrating a method of determining engagement preference in one embodiment of the present disclosure. The process, for example, may be used by the engagement time and modality estimation component of an engagement engine (e.g., FIG. 1, 126). At 1002, user engagement level may be inferred, for example, to understand the level of engagement of a user, for instance, regularity of content launches, how likely is the user to engage in the next period. The engagement level may be inferred based on historical data such as broad user behavior data 1006 and the particular user or peer behavior data 1008. At 1004, an action may be determined based on one or more decision rules and the state of the user, e.g., inferred at 1002. The action may include no action 1010, sending a reminder to re-engage with content previously consumed 1012, sending an email to suggest new content 1014. Sending a reminder 1012 or an email 1014 may be done at a time that is determined at 1016 to be the optimal or best time (e.g., day of week, time of day) for the user, e.g., to receive email. The timing estimate at 1016 may be determined based on the broad user behavior data 1006 and user/peer behavior data 1008.

Figure 11:
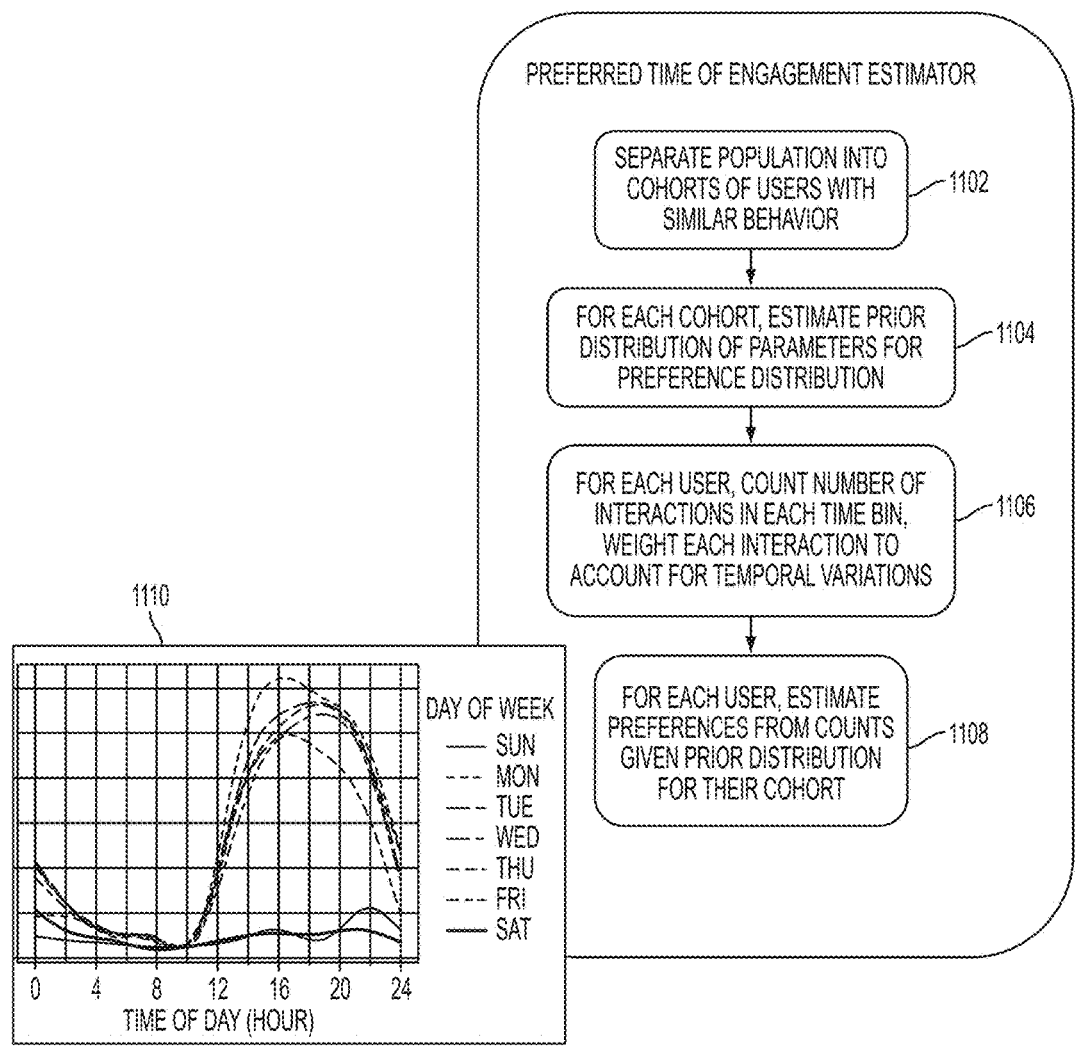
FIG. 11 is a flow diagram illustrating a method of determining an engagement time in one embodiment of the present disclosure.

FIG. 11 is a flow diagram illustrating a method of determining an engagement time in one embodiment of the present disclosure. The process, for example, may be used by the engagement time and modality estimation component of an engagement engine (e.g., FIG. 1, 126). Input to the method may include a sequence of user content interaction times. Outputs of the method may include a likelihood that a user will interact with content at a particular time of week, given that the user interacts that week (or another time period or duration). In one embodiment, estimate is produced for all users; Peaks of this distribution indicate the best points at which to engage with the user. The method in one embodiment improves estimation by using cohorts of users to reduce effects of limited data; Uses a prior distribution on the parameters of the preference distributions to capture broad behaviors and reduce sparsity. An example of the likelihood distribution is shown at 1110. At 1102, user population is separated into cohorts of users with similar behavior. At 1104, for each cohort, prior distribution of parameters is estimated for preference distribution. At 1106, for each user, number of interactions is counted in each time bin, each interaction is weighted to account for temporal variations. At 1108, for each user, preferences are estimated from counts given prior distribution for their cohort.

As described above, a method and system of the present disclosure may identify one or more patterns of content consumption across diverse entities (e.g., firms, business units, industries, sectors, geographies, and/or others) and leverage the identified patterns to drive engagement. A consumption profile vector may be computed based on content consumed and an input content hierarchy and a given time window of activity. Two or more consumption profile vectors may be compared for disparate entities or disparate time periods and an indication may be provided responsive to detecting a strategic change. The appropriate content to recommend may be determined responsive to detecting a strategic change in consumption profile vectors. Virtual folders of common consumer assets may be derived and user goals may be inferred from such virtual folders of consumption patterns to create new customized learning plans. A set of complementary metrics may be identified to characterize a business value. The value of an individual metric may be assessed in comparison to a known metric. A set that is complementary may be selected among several candidate metrics.

Figure 12:
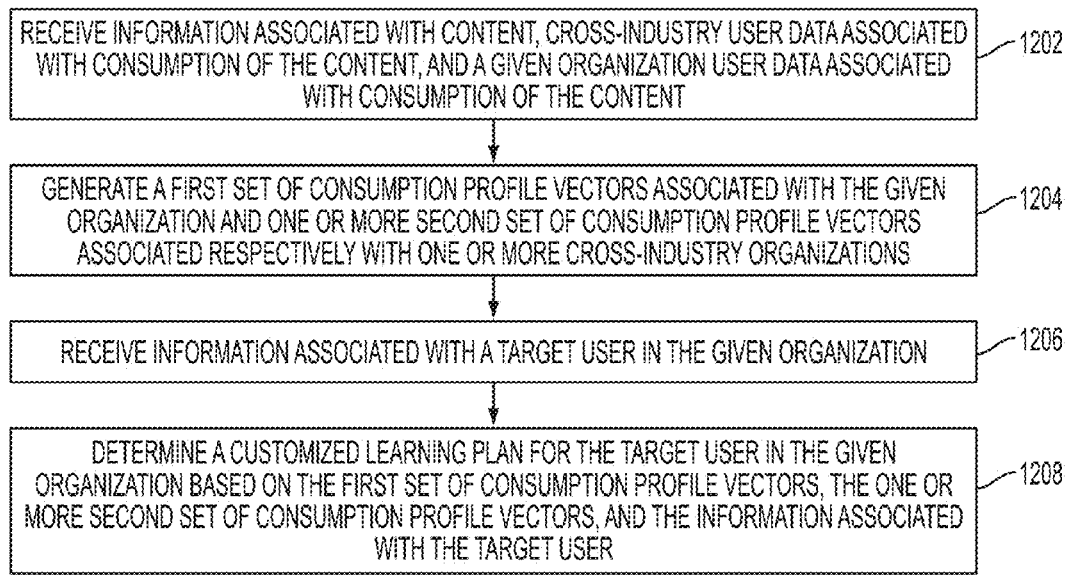
FIG. 12 is a flow diagram illustrating a method of providing engagement actions for learning in one embodiment of the present disclosure.

FIG. 12 is a flow diagram illustrating a method of providing engagement actions for learning in one embodiment of the present disclosure. At 1202 information associated with content, cross-industry user data associated with consumption of the content, and a given organization user data associated with consumption of the content is received. At 1204 a first set of consumption profile vectors associated with the given organization and one or more second set of consumption profile vectors associated respectively with one or more cross-industry organizations are generated. At 1206, information associated with a target user in the given organization is received. At 1208, a customized learning plan is determined for the target user in the given organization based on the first set of consumption profile vectors, the one or more second set of consumption profile vectors, and the information associated with the target user, for example, as described above. In one embodiment, the customized learning plan specifies the target user, one or more courses for learning, estimated time for consuming the one or more courses, and modality of consuming the one or more courses.

A method, system and/or techniques in the present disclosure may derive strategy-related insights, and consolidate such insights across multiple customers in multiple sectors to develop strategy-enabling learning plans for each individual customer given a set of content consumption behavior. The method, system and/or techniques in the present disclosure may provide a way to identify intrinsic strategic patterns of content consumption across diverse entities, and leverage the identified patterns, for example, to drive engagement for improved entity strategic alignment.

In one aspect, the present disclosure, for example, describes how to derive meaningful strategic insights from consumption data that may already exists in an organization's data warehouses. The present disclosure in one aspect considers content consumption, how it relates to business strategy, and how it can be used to drive engagement. The analytics in the present disclosure may directly pertain to strategy and detecting changes in strategy. The analytics may evaluate strategic shifts to provide guidance on strategic directions and/or learning need identification. Guidance may be provided in terms of recommended strategic directions and/or learning need identification. The guidance may take the form of a set of content for consumption or learning path; the elements of this set may be derived from behavior across multiple organization. In one aspect, consumption patterns of an organization's employees (e.g., and across organizations) may be evaluated to make inferences about strategy changes. The present disclosure may provide a way to compare consumption profile vectors (e.g., a metric derived from available consumption data) and detect strategic changes. An organization's profile across that organization's content hierarchy may be evaluated, for example, at the organization level.

Figure 13:
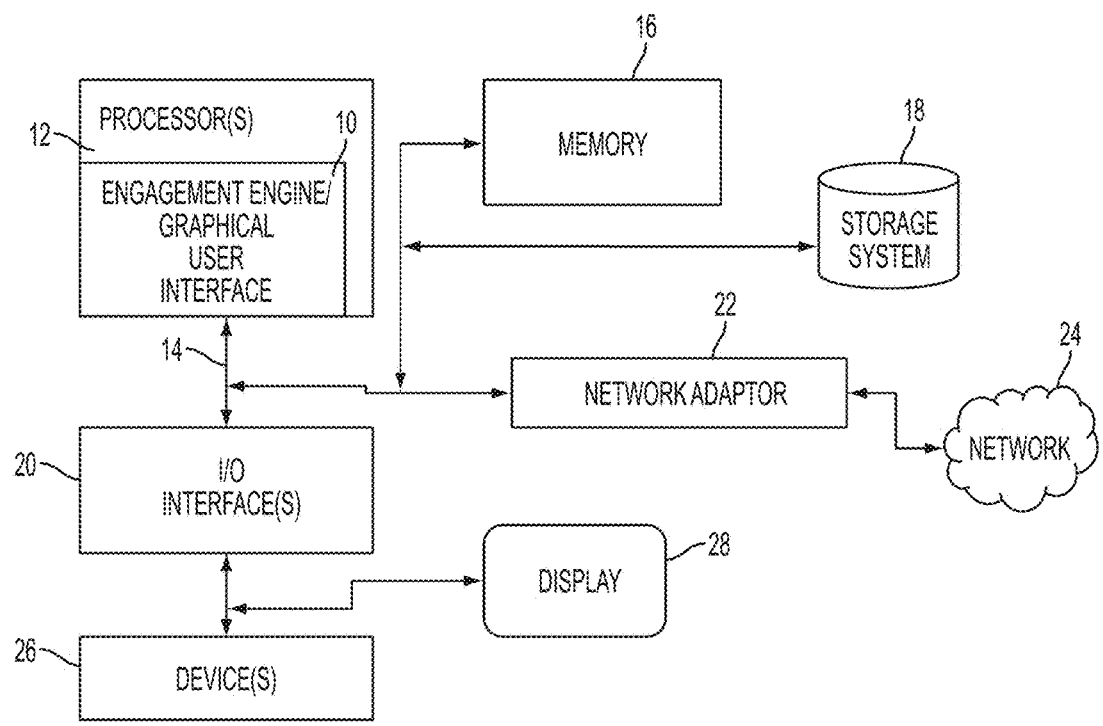
FIG. 13 illustrates a schematic of an example computer or processing system that may implement a system that provides an engagement engine described above, in one embodiment of the present disclosure.

FIG. 13 illustrates a schematic of an example computer or processing system that may implement a system that provides an engagement engine described above, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an engagement engine module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system of identifying one or more patterns of content consumption across multiple entities and determining an engagement action for a user of an entity based on the patterns, comprising:
    one or more hardware processors;
    an engagement engine operable to execute on one or more of the hardware processors, the engagement engine further operable to receive information associated with content, cross-industry user data associated with consumption of the content, and a given organization user data associated with consumption of the content,
    the engagement engine further operable to generate a first set of consumption profile vectors associated with the given organization and one or more second set of consumption profile vectors associated respectively with one or more cross-industry organizations,
    wherein a consumption profile vector is determined as a function of a fraction of content interactions in a content catalog for a plurality of content catalogs during a time window, the first set of consumption profile vectors comprising a plurality of the consumption profile vector computed across multiple time windows and computed based on the given organization user data associated with consumption of the content, and the one or more second set of consumption profile vectors comprising a plurality of the consumption profile vector computed across the multiple time windows and computed based on cross-industry user data associated with consumption of the content for respective one or more cross-industry organizations, the consumption profile vector detecting trends in learning and a shift in strategic direction of the given organization and the one or more cross-industry organizations,
    the engagement engine further operable to receive information associated with a target user in the given organization,
    the engagement engine further operable to determine a customized learning plan for the target user in the given organization based on the first set of consumption profile vectors, the one or more second set of consumption profile vectors, and the information associated with the target user,
    the customized learning plan specifying the target user, one or more courses for learning, estimated time for consuming the one or more courses, and modality of consuming the one or more courses,
    wherein a learning system automatically runs the one or more courses according to the modality at the estimated time by at least automatically opening a graphical user interface on a device associated with the user.

2. The system of claim 1, further comprising a key performance indicator (KPI) generator operable to determine a set of complementary KPIs for selecting the target user.

3. The system of claim 2, wherein to determine said complementary KPIs, the KPI generator is operable to identify distributional relationships between candidate metrics and existing metrics for the given organization, extract parameters characterizing a relationship of a candidate metric and an existing metric for each of the candidate metrics, and identify a representative subset of metrics using a list of the parameters.

4. The system of claim 2, wherein the target user meeting the KPI criteria is selected.

5. The system of claim 1, wherein the engagement engine determines said one or more courses based on generating a list of virtual folders that comprise virtual combinations of commonly consumed assets and a probability profile of the target user's interest in the virtual folders.

6. The system of claim 1, wherein the information associated with content comprises hierarchy of content folders.

7. A computer-implemented method of identifying one or more patterns of content consumption across multiple entities and determining an engagement action for a user of an entity based on the patterns, the method performed by one or more processors, comprising:
 receiving information associated with content, cross-industry user data associated with consumption of the content, and a given organization user data associated with consumption of the content;
 generating a first set of consumption profile vectors associated with the given organization and one or more second set of consumption profile vectors associated respectively with one or more cross-industry organizations,
 wherein a consumption profile vector is determined as a function of a fraction of content interactions in a content catalog for a plurality of content catalogs during a time window, the first set of consumption profile vectors comprising a plurality of the consumption profile vector computed across multiple time windows and computed based on the given organization user data associated with consumption of the content, and the one or more second set of consumption profile vectors comprising a plurality of the consumption profile vector computed across the multiple time windows and computed based on cross-industry user data associated with consumption of the content for respective one or more cross-industry organizations, the consumption profile vector detecting trends in learning and a shift in strategic direction of the given organization and the one or more cross-industry organizations;
 receiving information associated with a target user in the given organization;
 determining a customized learning plan for the target user in the given organization based on the first set of consumption profile vectors, the one or more second set of consumption profile vectors, and the information associated with the target user,
 the customized learning plan specifying the target user, one or more courses for learning, estimated time for consuming the one or more courses, and modality of consuming the one or more courses,
 wherein a learning system automatically runs the one or more courses according to the modality at the estimated time by at least automatically opening a graphical user interface on a device associated with the user.

8. The method of claim 7, further comprising determining a set of complementary key performance indicators (KPIs) for selecting the target user.

9. The method of claim 8, wherein the determining a set of complementary key performance indicators (KPIs) comprises:
 identifying distributional relationships between candidate metrics and existing metrics for the given organization;
 for each of the candidate metrics, extracting parameters characterizing a relationship of a candidate metric and an existing metric; and
 identifying a representative subset of metrics using a list of the parameters.

10. The method of claim 9, wherein the identifying a representative subset of metrics is performed for each of the cross-industry organizations.

11. The method of claim 9, wherein the target user meeting criteria of the complementary KPIs is selected.

12. The method of claim 7, further comprising generating a list of virtual folders that comprise virtual combinations of commonly consumed assets and generating a probability profile of the target user's interest in the virtual folders, wherein the one or more courses are identified based on the list of virtual folders and the probability profile.

13. The method of claim 7, wherein the information associated with content comprises hierarchy of content folders.

14. A computer readable storage medium storing a program of instructions executable by a machine to perform a method of identifying one or more patterns of content consumption across multiple entities and determining an engagement action for a user of an entity based on the patterns, the method comprising:
 receiving information associated with content, cross-industry user data associated with consumption of the content, and a given organization user data associated with consumption of the content;
 generating a first set of consumption profile vectors associated with the given organization and one or more second set of consumption profile vectors associated respectively with one or more cross-industry organizations,
 wherein a consumption profile vector is determined as a function of a fraction of content interactions in a content catalog for a plurality of content catalogs during a time window, the first set of consumption profile vectors comprising a plurality of the consumption profile vector computed across multiple time windows and computed based on the given organization user data associated with consumption of the content, and the one or more second set of consumption profile vectors comprising a plurality of the consumption profile vector computed across the multiple time windows and computed based on cross-industry user data associated with consumption of the content for respective one or more cross-industry organizations, the consumption profile vector detecting trends in learning and a shift in strategic direction of the given organization and the one or more cross-industry organizations;
 receiving information associated with a target user in the given organization;
 determining a customized learning plan for the target user in the given organization based on the first set of consumption profile vectors, the one or more second set of consumption profile vectors, and the information associated with the target user,
 the customized learning plan specifying the target user, one or more courses for learning, estimated time for consuming the one or more courses, and modality of consuming the one or more courses,
 wherein a learning system automatically runs the one or more courses according to the modality at the estimated time by at least automatically opening a graphical user interface on a device associated with the user.

15. The computer readable storage medium of claim 14, further comprising determining a set of complementary key performance indicators (KPIs) for selecting the target user.

16. The computer readable storage medium of claim 15, wherein the determining a set of complementary key performance indicators (KPIs) comprises:
- identifying distributional relationships between candidate metrics and existing metrics for the given organization;
- for each of the candidate metrics, extracting parameters characterizing a relationship of a candidate metric and an existing metric; and
- identifying a representative subset of metrics using a list of the parameters.

17. The computer readable storage medium of claim 16, wherein the identifying a representative subset of metrics is performed for each of the cross-industry organizations.

18. The computer readable storage medium of claim 16, wherein the target user meeting criteria of the complementary KPIs is selected.

19. The computer readable storage medium of claim 14, further comprising generating a list of virtual folders that comprise virtual combinations of commonly consumed assets and generating a probability profile of the target user's interest in the virtual folders, wherein the one or more courses are identified based on the list of virtual folders and the probability profile.

20. The computer readable storage medium of claim 14, wherein the information associated with content comprises hierarchy of content folders.

* * * * *